United States Patent Office 2,759,177
Patented Aug. 14, 1956

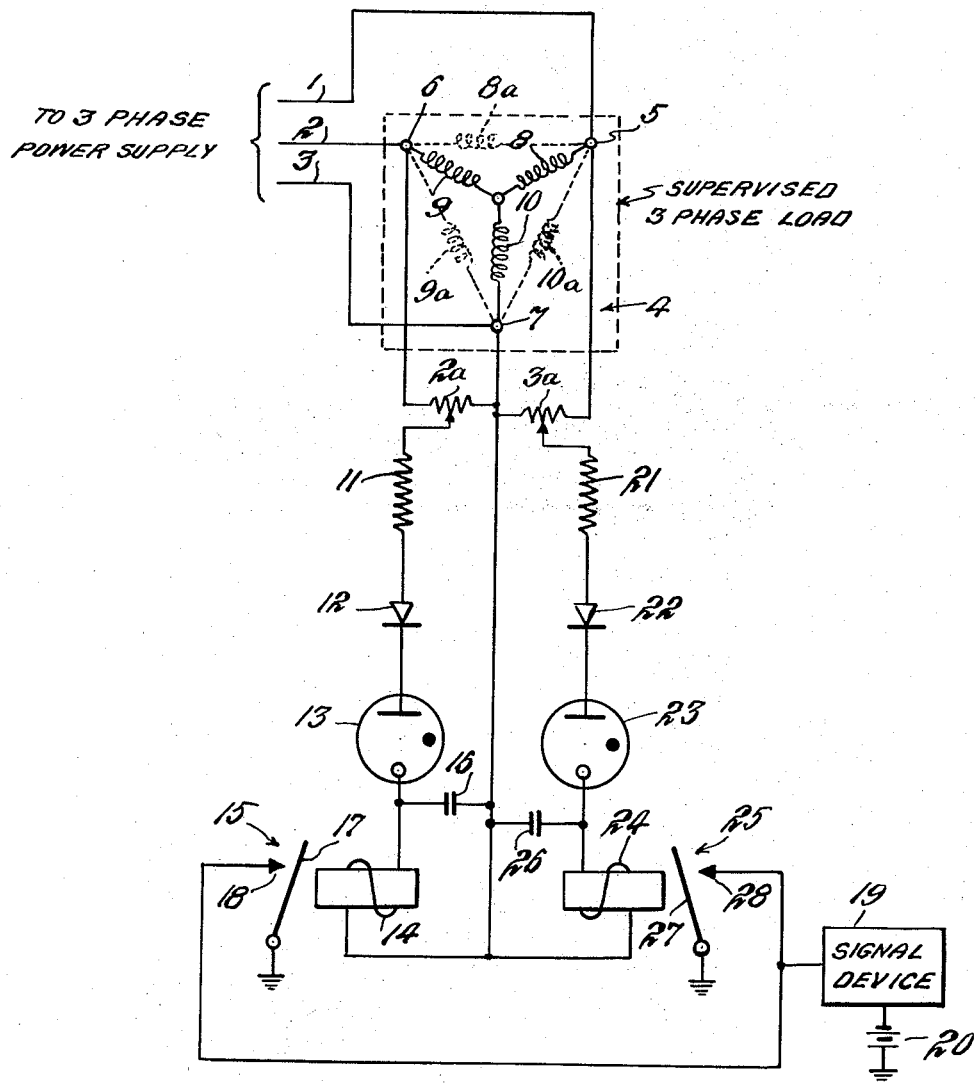

2,759,177

POLYPHASE POWER FAILURE INDICATOR

Kenneth R. Hightower, Wichita, Kans., assignor to Beech Aircraft Corporation, Wichita, Kans., a corporation of Delaware Application December 30, 1953, Serial No. 401,244

8 Claims. (Cl. 340—253)

The present invention relates to supervisory apparatus for indicating power failure of any phase of a polyphase power supply at the terminals of a polyphase device whose reliable operation requires full simultaneous energization from all of the phases of the polyphase power supply.

The invention is suitable for use either with single phase systems, or with polyphase systems. By way of illustration, the invention is shown supervising a 3-phase 400 cycle power system such as one of the systems presently used in aircraft. Polyphase systems of this type are used with gyroscopic or other devices operating on the principle of a polyphase induction motor.

It is well known that a polyphase induction motor running under light load will continue to operate as a single phase motor so long as power is supplied to one of its phases. Its operation as a single phase motor, however, is unreliable and may become erratic. In the case of aerial navigation instruments, erratic or unreliable operation may seriously impair flight safety.

It is accordingly an object of the invention to provide a power supply supervisory device which will indicate power failure or serious undervoltage of any phase at the terminals of a power utilization device energized from a polyphase power supply system.

Another object of the invention is the provision of a power supply supervisory device of this character which is compact, light in weight, inexpensive to manufacture, both shock and vibration resistant and otherwise suitable for aircraft use.

A further object of the invention is to provide power supply supervisory apparatus which will operate with a polyphase power supply of a frequency of the order of 400 cycles or higher, at which frequency electromagnetic supervisory apparatus of conventional alternating current construction cannot be used.

Still another object of the invention is the provision of means for conveniently adjusting the voltage at which the supervisory indication is to be given.

Another object of the invention is the provision of means using a combination of conventional direct current relays and gaseous discharge devices so arranged that all critical marginal characteristics of the supervisory circuits are determined by the gaseous discharge devices, thereby avoiding the necessity for critical adjustment of the relays.

Other and further objects will become apparent upon reading the following specification together with the accompanying drawing forming a part thereof.

In the drawings,

Fig. 1 is a schematic circuit diagram of an embodiment of the invention;

Fig. 2 is a fragmentary diagram illustrating certain voltage relationships under a power failure condition to which the embodiment shown in Fig. 1 is responsive;

Fig. 3 is similar to Fig. 2, except that the load is delta-connected instead of Y-connected.

Referring to the drawing, three line conductors 1, 2 and 3 extend to a three-phase power supply (not shown), such as a 400 cycle inverter driven from the 24 volt direct current power supply of an aircraft, the normal line voltage of each phase being of the order of 115 volts. A balanced three-phase power utilization device designated generally as 4 is shown with three load terminals 5, 6 and 7 connected for energization from the line conductors 1, 2 and 3, respectively, the load being equally divided among the three phases so that the impedances of the three load windings 8, 9 and 10 are equal. The load windings 8, 9 and 10 are shown Y-connected for purposes of illustration, but they may be delta-connected, as indicated in dotted lines at 8a, 9a and 10a, without materially affecting the operation of the invention, provided only that their impedances are equal.

An adjustable potentiometer 2a is shown connected across load terminals 6 and 7 so that an adjustable portion of the phase voltage between line conductors 2 and 3 may be applied to the supervisory circuits described below. A similar potentiometer 3a is shown connected across load terminals 5 and 7 to derive an adjustable portion of the phase voltage between line conductors 1 and 3.

Serially connected in a circuit extending from load terminals 6 and 7 through potentiometer 2a, are a current limiting resistor 11, a half-wave rectifier 12, a gaseous discharge diode 13 and the operating winding 14 of an electromagnet, shown as a supervisory relay designated generally as 15. A capacitor 16 is shunted across operating winding 14 for filtering the half-wave rectified current from rectifier 12, which would otherwise tend to make supervisory relay 15 noisy when energized. When operating winding 14 of supervisory relay 15 is entirely deenergized, its contacts 17 and 18 closed, thereby completing a ground circuit to a signal device 19 which is energized from a separate power source independent of the three-phase power supply conductors 1, 2 and 3, this independent power source being illustratively shown as a grounded battery 20.

A similar independent supervisory circuit extending from load terminals 5 and 7 through potentiometer 3a includes a further current limiting resistor 21, a half-wave rectifier 22, a gaseous discharge diode 23 and the operating winding 24 of another supervisory relay designated generally as 25. A filter capacitor 26 is shunted across the operating winding 24 of supervisory relay 25 to prevent noisy operation. When supervisory relay 25 is deenergized, it closes its contacts 27 and 28 thereby applying ground to signal device 19 so that a power failure indication is given.

The gaseous discharge diodes 13 and 23 are preferably of the cold cathode type having a firing voltage to produce current flow lying in the range between the peak line voltage and one-half of the peak phase voltage as measured at load terminals 6 and 7 or 5 and 7, and adjusted by the potentiometers 2a and 3a, respectively. If either of their firing voltages is such that current flow takes place at less than half the peak line voltage, as measured at load terminals 6 and 7 or 5 and 7, then deenergization of power conductor 3 and load terminal 7 will remain undetected.

With only load terminals 5 and 6 energized, as shown in Figs. 2 and 3, which condition would occur if power conductor 3 were broken, the equal impedances of load windings 8 and 9 are energized with single phase power from line conductors 1 and 2 and they act as a voltage divider, applying one-half the line voltage at terminals 5 and 6 to terminals 6 and 7 through load winding 10. Similarly, the other half of the line voltage at terminals 5 and 6 is applied to terminals 5 and 7 through load winding 10. Each of the supervisory relays 15 and 25 is thus connected in a circuit energized substantially at one-half the maximum working line voltage, with the load winding 10 acting as a center-tap equalizing connection preventing voltage unbalance between the two supervisory relay circuits.

Fig. 3 illustrates a similar condition in the case of a delta-connected load. Load winding 8a receives full single phase voltage from line conductors 1 and 2. Load windings 9a and 10a are connected in series with each other across line conductors 1 and 2 and, since their impedances are equal, they act as a voltage divider. Thus, one-half of the line voltage appears at load terminals 6 and 7 and the other half appears at load terminals 7 and 5. Operation under these conditions is thus substantially the same as for the Y-connected load shown in Fig. 2. Unless these two supervisory relay circuits both close their contacts 17—18 and 27—28 under this half voltage condition, proper phase failure supervision cannot be obtained.

Obviously each of the two supervisory relays 15 and 25 must maintain its contacts 17 and 18 and contacts 27 and 28, respectively, open when the line voltage is at its minimum normal operating value. Otherwise a false phase failure indication will be given with all phases properly balanced before an actual under-voltage condition is reached.

If conductor 1 is broken, the supervisory circuit including relay 25 receives half-voltage and relay 25 releases, closing its contacts 27—28 and actuating signal device 19. The voltage across load terminals 6 and 7 remains unaffected and supervisory relay 15 remains operated.

If conductor 2 is broken, the supervisory circuit including relay 15 receives half-voltage and relay 15 releases, closing its contacts 17—18 and actuating signal device 19. The voltage across load terminals 5 and 7 remains unaffected and supervisory relay 25 remains operated.

If conductor 3 is broken, as described above, both relays 15 and 25 receive half-voltage and both relays release, closing their contacts and actuating signal device 19.

It should be noted that the potentiometers 2a and 3a permit adjustment to obtain the correct firing operation for the gaseous discharge diodes 13 and 23, respectively. Each of the supervisory relays 15 and 25 may be caused to release at the same predetermined line voltage, notwithstanding a difference between the actual firing voltages of diodes 13 and 23 which is inherent in the commercial prodution of such devices.

In each of the supervisory circuits, the shunt filter capacitor 16 or 26 becomes charged to a potential which is below the difference between the peak line potential and the firing voltage of the gaseous discharge diode 13 or 23. Reverse current flow is prevented by the rectifiers 12 and 22. When the line voltage drops to a point where its full peak value is insufficient to fire one of the gaseous discharge diodes 13 or 23 with the corresponding filter capacitor 16 or 26 completely discharged, then the current through the associated relay winding 14 or 24 will fall to zero and the corresponding relay 15 or 25 will release under open circuit conditions and will remain released until the peak line voltage rises to a value sufficient to fire the diode. As soon as the diode fires its associated capacitor becomes rapidly charged, since the charging current is limited only by the resistor 11 or 21 and the forward resistance of the rectifier 12 or 22. There may thus be a narrow voltage range in which the relays 15 and 25 operate intermittently. This range of intermittent operation may be narrowed by increasing the relay sensitivity. So long as the firing voltage of each lay diode 13 and 23 exceeds one-half the maximum peak value of the line voltage, however, power failure of any phase will be determined independently of the release current adjustment of the relays 15 and 25, provided only that these relays will release under zero current or open circuit conditions. This avoids the necessity for maintaining accurate mechanical adjustment of the relays to release at any critical voltage other than zero. The firing voltages of the gaseous discharge diodes are fixed and are extremely stable as compared with the mechanical adjustment of a marginal relay.

Although the invention has been illustratively shown and described as applied to a 3-phase system, it should be noted that a single supervisory circuit, such as the circuit comprising potentiometer 2a, limiting resistor 11, half-wave rectifier 12, gaseous discharge diode 13 and relay 15, may be used for the supervision of a single phase or any individual phase of a polyphase system.

*Example*

An entirely satisfactory commercial phase failure indicator for aircraft use with a 115 volt, 3-phase 400 cycle power supply has been developed using the following circuit elements:

| | |
|---|---|
| Resistors 11 and 21 | 51 ohms—1 watt. |
| Rectifiers 12 and 22 | 20 milliamp.—selenium. |
| Gas discharge diodes 13 and 23. | Type OB2 voltage regulator tubes. |
| Relays 15 and 25 | 2500 ohm D. C. relays "Advance type 1200." |
| Capacitors 16 and 26 | 0.5 mfd. |

While what is shown is believed to be the best embodiment of the invention, it should not be confined to this particular embodiment. What is desired to be secured by Letters Patent is the invention as defined in the appended claims.

What is claimed is:

1. Supervisory apparatus for indicating the failure of an alternating voltage with reference to a critical minimum voltage value, comprising rectifying means, gaseous discharge means having a firing voltage substantially equal to the peak value of said critical voltage, a direct current electromagnet having an operating winding, said electromagnet giving a supervisory indication when said winding is substantially entirely deenergized, a hum preventing capacitor shunted across said winding, circuit means connecting said rectifying means, said discharge means and said winding in series for energization by said voltage to be supervised, and a current limiting resistor included in said circuit means in series with said gaseous discharge means for limiting peak charging current flow through said discharge means into said capacitor.

2. Apparatus according to claim 1, in which said gaseous discharge means is a cold cathode diode.

3. Apparatus according to claim 1, wherein said circuit means comprises means for applying an adjustable portion of said alternating voltage to said serially connected means and said winding.

4. Supervisory apparatus for indicating voltage failure of any phase of a source of three-phase alternating voltage at a balanced three-phase load having three load terminals connected to said source, said apparatus comprising two rectifying means, two gaseous discharge means, each having a firing voltage in the range between one-half the peak maximum working phase voltage between two terminals of said load and the peak of the minimum working phase voltage, two electromagnets, each having an operating winding, each of said electromagnets giving a supervisory indication when its operating winding is entirely deenergized, a first circuit means connecting one of said rectifying means, one of said discharge means and one of said windings in series for energization along with two of said load terminals, and a second circuit means connecting the other of said rectifying means, the other of said discharge means and the other of said windings in series for energization along with one of said two last-named load terminals and the third load terminal.

5. Apparatus according to claim 4, further comprising two current limiting resistors, one of said resistors being serially included in the series connection of said first circuit means and the other of said resistors being serially included in the series connection of said second circuit means.

6. Apparatus according to claim 4, in which said gaseous discharge means is a cold cathode diode.

7. Apparatus according to claim 4, further comprising two capacitors, each capacitor being individually shunted across one of said windings.

8. Apparatus according to claim 4 wherein said first and said second circuit means each comprises individually adjustable means for energizing said series connected means and said winding from said load terminals, whereby the energization voltage thereof may be varied.

References Cited in the file of this patent

UNITED STATES PATENTS

| | | |
|---|---|---|
| 2,052,057 | Reid | Aug. 25, 1936 |
| 2,546,555 | Meredith et al. | Mar. 27, 1951 |